May 28, 1968 H. GREBER 3,385,197
WIND EJECTOR FOR COOLING TOWERS AND STACKS
Filed Aug. 5, 1966
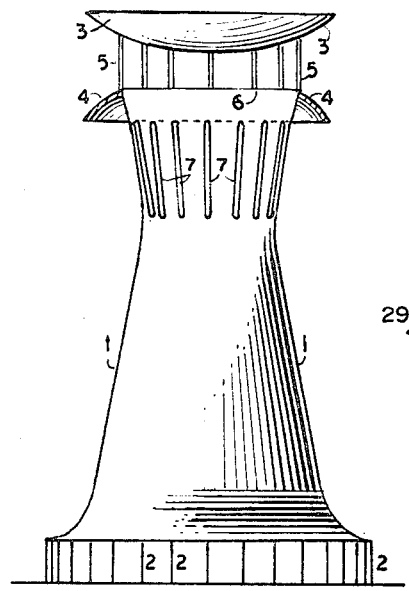
FIG.1
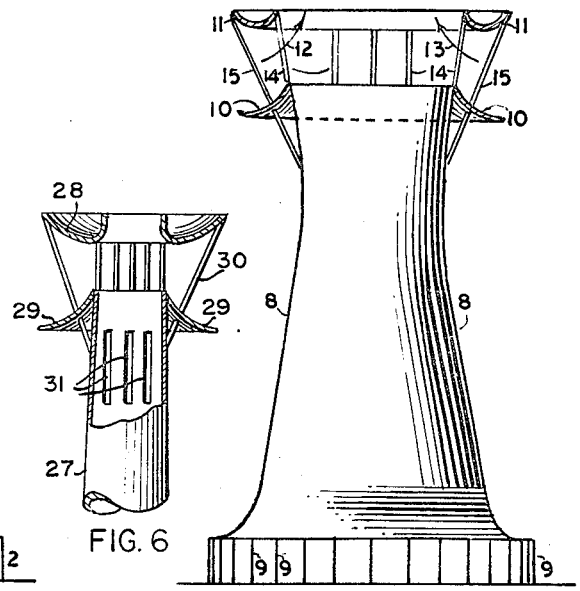
FIG.6
FIG.2
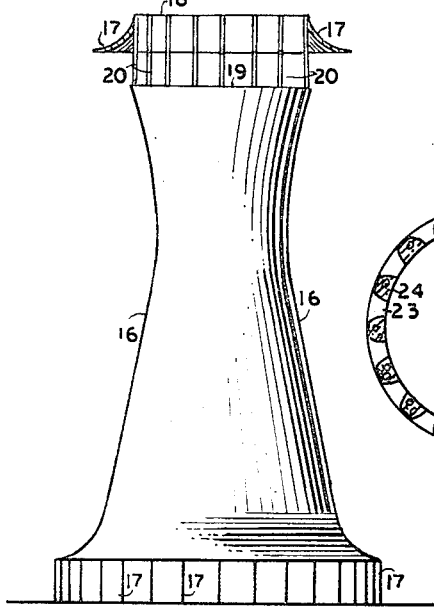
FIG.3
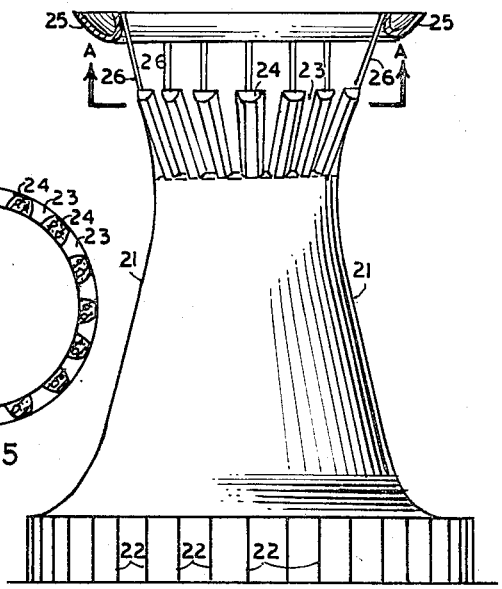
FIG.5
FIG.4
INVENTOR.
Henry Greber 3,385,197
**WIND EJECTOR FOR COOLING TOWERS
AND STACKS**
Henry Greber, 225 W. 86th St., Apt. 8-D,
New York, N.Y. 10024
Filed Aug. 5, 1966, Ser. No. 570,574
1 Claim. (Cl. 98—58)

ABSTRACT OF THE DISCLOSURE

An apparatus for increasing the draft of tall tubular structures such as cooling towers and stacks by means of utilizing the energy of the winds blowing over them. The energy of the wind is utilized by application of pairs of curved surfaces forming a Venturi-tube type construction at the upper part of said tubular structure. The curved surfaces are arranged horizontally, or vertically. In the latter case they constitute curved slots in the tubular structure.

---

The purpose of this invention is to create a simple static wind ejector for utilization of the energy contained in the wind. This energy can be used for creation of drafts in cooling towers, stacks, and similar structures. By application of wind ejectors according to this invention, savings can be made in the purchase and installations costs of draft fans, or at least in the costs of electric energy to drive them, in structures in which drafts are required. In some cases these draft fans can be entirely supplanted, in other cases they can be only supplemented by wind ejectors described in this specification. This invention is intended to be applied for wet, but particularly for dry cooling towers. The "natural" draft in a cooling tower is caused by the difference of air density in, and outside of it. In wet cooling towers this difference is due to the heating of the air in the tower by the condensate, and by water vapor which is lighter than air and creates an updrift. The water vapor is created by evaporation of some part of the cooling water. The dry cooling tower operates without cooling water. The only source of draft in it is the heat given up by the condensate to the air stream in the tower.

There are facts clearly indicating that in the future the application of dry cooling towers will grow, and the application of wet cooling towers will decline. These facts are: the number of convenient sites at rivers and lakes with abundant cooling water available for industrial uses is rapidly decreasing. The increased temperature of these bodies of water, and possible water polution is vigorously objected by the public. Selection of power plant sites at the sources of cooling water causes expensive detours in the transport of fuel and in the transmission of electric energy. As the sizes of electric power plants and other industrial plants are continually increased, it is increasingly difficult to find the required by them amounts of cooling water. The only logical solution of the problem seems to be the dry cooling tower, which, therefore, appears as the thing unavoidably to come. Consequently, it is the purpose of this invention to provide dry cooling towers with an additional source of draft in form of the here described wind ejector. A further purpose of this invention is to reduce the friction of the air stream on the walls of cooling towers and like structures. These purposes are achieved by application of the ejector principle, as it is well known from its simplest form as sprayer, such for example as used by children to make soap bubbles, or such as used in atomizers applied for spraying perfumes. This simple ejector is only good for one direction of the air flow. The wind can blow from any direction. To utilize its energy the here described ejector works for any direction of the stream through it. The reduction of the friction of the air stream is provided by flaring the lower end of the cooling tower. Thereby, the vertical section of the wall of the tower resembles the shape of the letter L. Through this shape, a smooth transition between the horizontal and the vertical part of the airstream is provided.

The practicality of the wind ejector according to this invention in its application for cooling towers, stacks and like industrial structure rests not only on the simplicity of the wind ejector itself, but also on the following meteorological fact. It has been found that the velocity of the wind at a point grows with the height of this point above ground level. This dependence is approximated by Hellman's formula $$w = k(1 + 2.8 \log(h + 4.75))$$

where $w$ is the velocity of the wind,
$h$ is the height of the observed point
$k$ is a constant For example, at a height of 500 feet above ground, the wind velocity is 275% of its value at ground level. Even more important than this is that at great height above ground, there is almost continual wind, though the air at ground level may be calm.

These meteorological facts are not new discoveries. They have been known and utilized for centuries. Wind mills have been erected on top of hills as high as possible, to keep them working almost continually. Because of the height at which cooling towers (300 to 400 feet) and stacks (500 to 900 feet) are erected, there is always some wind on top of them. It is safe to assume that at these heights the wind velocity rarely drops below ten miles per hour, though its direction may vary.

The nature of this wind ejector, its modifications as horizontal ejector or as vertical slot-ejector, and its further advantages will become apparent from the following specification and from the accompanying drawing.

In this drawing, FIGURE 1 is a vertical sectional view taken through the center line of tower provided with both, with a horizontal wind ejector and with vertical wind ejectors in form of slots in the wall of the cooling tower. FIGURE 2 is also a vertical sectional view taken along the axis of a cooling tower. This tower is also provided with a horizontal wind ejector, but it has no roof. Similarly, FIGURE 3 shows another vertical sectional view taken through the center line of a cooling tower provided with a horizontal wind ejector, but this wind ejector has no lower collar. FIGURE 4 represents a side elevational view of cooling tower, whose top, however is shown in vertical sectional view. The cross sectional view of the same cooling tower, taken along line A—A is shown in FIGURE 5. A stack provided with a horizontal, roofless wind ejector and with vertical slot ejectors, is presented in elevational view and partly in vertical sectional view in FIGURE 6.

In detailed review of this drawing, it can be seen that the cooling tower wall 1 rests on columns 2. The spaces between these columns constitute the inlet port of the cooling tower. The direction of the air stream in this inlet port is horizontal. After passing the inlet port, the air stream changes its direction, following the part of the wall that has an L shaped cross section, and becomes vertical. The wind ejector consists of two lenticular surfaces, 3 and 4, facing each other with their convex sides. Surface 3 forms the roof of the cooling tower. It is supported on struts 5, which are fastened to the top of the cooling tower. The middle part of surface 4 is taken up by the outlet 6, of the cooling tower. Thus all that remains from surfaces 4, is a collar-like brim around the top of the tower. The upper part of the wind ejector 3, that is the roof, must be as light as possible. For this purpose it can be made of sheet aluminum, supported on an aluminum lattice structure or on aluminum struts. The vertical wind ejectors have the form of slots in the wall of the upper part of the cooling tower. Their cross section is trapezoidal, similar to the one shown in FIGURE 5. That is, the width of a slot is larger on the outside, than it is on the inside wall.

In FIGURE 2, the cooling tower 8 is erected on the columns 9. The spaces between columns 9 constitute the inlet port of the cooling tower. The wind ejector of this cooling tower consists of two collar-like surfaces 10 and 11. The two surfaces 10 and 11 have such curvatures that the wind blowing between them is directed upward. The direction of the flow of wind is indicated with the arrows 12 and 13. The important feature of this wind ejector is that it has no roof. This feature decreases the air resistance of the updraft in the tower. The roofless construction of the wind ejector and its lower collar prevent the recirculation of the tower exhaust back into its inlet, and also prevents the formation of ground fog. The surfaces 10 and 11 are fastened to the top of the cooling tower by means of struts 14 and 15.

The cooling tower 16, whose vertical sectional view is shown in FIGURE 3, is supported on columns 17. Its wind ejector consists only of one surface 17, constituting the upper collar. This wind ejector, as the preceding, is roofless. The circular opening 18 in the central part of collar 17 is as large as the outlet 19 of the cooling tower. Columns 20 serve for fastening of the collar surface 17 to the top of the tower.

The lower part of FIGURE 4 represents an elevational view of the cooling tower 21, resting on columns 22. On the upper part of the cooling tower can be seen vertical slots 23, constituting the vertical wind ejectors. These can be seen in the horizontal cross-sectional view taken along line A—A and shown in FIGURE 5. The upper part of FIGURE 5 is a vertical sectional view. It shows the upper collar 25 of the horizontal wind ejector. Also wind ejector 25 is roofless. It is supported on columns 26. These columns 26 are fastened to slabs 24, which separate slots 23 from each other. Slabs 24 can be seen in the cross-sectional view shown in FIGURE 5.

In the lower part of FIGURE 6 is shown the elevational view of stack 27. The upper part of FIGURE 6 shows a vertical sectional view of this stack. It can be seen that stack 27 is equipped with a horizontal wind ejector, consisting of upper collar 28, which is roofless, and of the lower collar 29. The surfaces 28 and 29 are so curved that the wind flowing between them is directed upward the stack. Struts 30 serve to support collars 28 and 29 to the top of the stack. The roofless structure of the wind ejector may be preferable for stack, where flyash dissipation is a problem. In other cases, the wind ejector with roof may be more advantageous. It can be seen in FIGURE 6, that the action of the horizontal wind ejector is reinforced with vertical wind ejectors in form of slots 31.

The horizontal wind ejector consists of two lens-shaped surfaces facing each other with their convex surfaces. Any vertical sectional view going through the center line of the tower shows the typical Venturi-tube shape. A wind coming from any direction and passing between the two lenticular surfaces, has its stream of air constricted. Therefore, the velocity of this stream of air is increased. As a result, the pressure of this stream drops. So, suction is created on top of a cooling tower and stack provided with a horizontal wind ejector. This suction of air creates a draft in the cooling tower or stack respectively.

The mode of operation of a vertical wind ejector is not different than that of a horizontal. As the stream of air of the wind passes the constriction of the slot, its velocity is increased, and in consequence, its pressure is decreased. The thus created suction produces the upward directed draft in the tower or stack structure.

Because of the identical mode of operation, the draft created by horizontal and by vertical wind ejectors can be calculated from the same formula.

$$d = (w_2^2/2g - w_1^2/2g)\eta$$

where $d$ is the draft
$w_1$ is the wind velocity at the moment,
$w_2$ is the wind velocity in the constriction,
$g$ is the gravitational acceleration,
$\eta$ (eta), is the efficiency of the ejector The efficiency of wind ejector can be cautiously assumed to be not more than 30%.

Velocity $w_2$ can be calculated from the relation $$w_2/w_1 = S_1/S_2$$

where $S_1$ is the non-restricted area of the wind ejector exposed to wind, and $S_2$ is the restricted area of the wind ejector passed by the wind.

As can be seen from the mode of operation of this wind ejector, also horizontal slots, or slots inclined toward the vertical can be used.

The roof over the cooling tower or stack as a part of the wind ejector is not indispensable for its operation. In some cases it is not even desired, though it gives a firmer guidance to the air stream passing through the wind ejector. Similarly, the lower collar of the horizontal wind ejector is not indispensable. It can be omitted, as shown in FIGURES 3 and 4, where it is partly replaced with the walls of the respective cooling towers. The omission of the lower collar simplifies the structure of the wind ejector, though it decreases somewhat its efficiency. Moreover, the horizontal wind ejector can be omitted, and only vertical slot-shaped wind ejectors can be used.

The most important characteristics of the air stream passing the lower part of the cooling tower is that it changes its direction from the horizontal to vertical. A filament of this air stream must describe a path of the form of the letter L with well rounded corners, in order to avoid excessive air friction on the wall of the cooling tower. Therefore, the shape of the lower part of the cooling tower must conform with the shape of the letter L with well rounded corner.

This wind ejector is intended for wet and dry cooling towers. It can also be used for combination wet-dry cooling towers. At sites at which a small amount of cooling water is available a crossbred between the dry and the wet cooling tower is feasible and useful. At times of increased load, or for lowering the condenser pressure, and with it the specific fuel consumption, the surface of the condensate-air heat exchanger is wetted, and the water evaporated. For this purpose only a small fraction of cooling water otherwise required in wet cooling towers, is necessary. As already stated, the most important application of this wind ejector is on top of dry cooling towers. To some extent, the adaptation of this wind ejector to dry cooling towers can contribute to make the selection of sites for electric generating stations independent from the availability of cooling water at these sites. The logical location of such sites is either at the source of fuel, or at the source of demand for electric power, even if cooling water is scarce at these locations.

In its application to stacks, the wind ejector according to this invention can make possible substantial savings in installation and maintenance costs of induced and forced draft fan, and in their electric energy consumptions.

While this invention is primarily conceived for cooling towers and stack, it can also be applied for a variety of structures of the chemical industry that require drafts.

Many modifications, variations and changes can be made in this invention, and it can be adapted in many ways to different applications, without departure from its spirit and from its scope as defined by the following claim.

I claim:
1. A tubular structure, such as used for cooling towers and stacks, carrying on top of it, and attached to it by attachment means, two curved surfaces, forming a constriction in the path of a wind horizontally blowing between them, so that the wind stream is accelerated over said tubular structure, and, in consequence, its pressure is reduced, thereby creating a draft in said tubular structure, whose top opening reaches into the lower of the said two curved surfaces, said curved surfaces being bent so that at their brims near the center of said tubular structure the wind leaving said brims is directed substantially upward; said tubular structure being also provided with vertical slots having convergently curved walls, whose width on the inside wall of said tubular structure is smaller than it is on the outside wall of said tubular structure, so that the wind blowing from outside into said tubular structure is accelerated within the walls of said slots, so that the wind stream passing said walls is accelerated toward the center of said tubular structure with the consequence that its pressure is reduced, which results in creation of a draft in said tubular structure.

References Cited

UNITED STATES PATENTS

| | | | |
|---|---|---|---|
| D. 135,039 | 2/1943 | Rowland | 98—84 X |
| 179,421 | 7/1876 | Merrick | 98—81 X |
| 201,466 | 3/1878 | Taylor | 98—83 |
| 498,571 | 4/1893 | Rettig. | |
| 693,195 | 2/1902 | Weightman. | |
| 1,340,033 | 5/1902 | Fojtik | 98—83 |
| 1,627,713 | 5/1927 | Seymour. | |
| 2,907,554 | 10/1959 | Heller. | |
| 144,586 | 11/1873 | Wingate | 98—78 |
| 1,549,813 | 8/1925 | Spring et al. | 98—78 |

FOREIGN PATENTS

| | | |
|---|---|---|
| 665,332 | 6/1963 | Canada. |
| 489,918 | 8/1938 | Great Britain. |
| 609,741 | 9/1948 | Great Britain. |
| 809,907 | 3/1959 | Great Britain. |
| 165,106 | 1/1950 | Austria. |
| 1,704 | 5/1868 | Great Britain. |
| 4,805 | 11/1906 | Great Britain. |
| 9,697 | 4/1907 | Great Britain. |
| 428,325 | 12/1947 | Italy. |

OTHER REFERENCES

German printed application No. 1,071,728, December 1959, Thamer.

HARRY B. THORNTON, *Primary Examiner.*

TIM R. MILES, *Examiner.*